United States Patent [19]

Mori

[11] 4,441,413
[45] Apr. 10, 1984

[54] PINEAPPLE CUTTER

[75] Inventor: Kashichi Mori, Iwatsuki, Japan

[73] Assignee: Kowa Shoji Kabushiki Kaisha, Tokyo, Japan

[21] Appl. No.: 385,952

[22] Filed: Jun. 7, 1982

[30] Foreign Application Priority Data

Aug. 1, 1981 [JP] Japan ............................ 56-115130[U]

[51] Int. Cl.³ ......................... A23N 4/00; A23N 4/20; A23N 7/08
[52] U.S. Cl. ........................................ 99/542; 99/544; 99/547; 99/593
[58] Field of Search ................. 99/539, 505, 541, 515, 99/542, 547, 543, 544, 545, 584, 588, 593, 644; 30/300, 301, 113.1, 113.3, 130, 117; 83/651.1; 408/199, 200

[56] References Cited

U.S. PATENT DOCUMENTS 3,874,280  4/1975  Vadas ..................................... 99/544

FOREIGN PATENT DOCUMENTS 76892  2/1918  Switzerland .......................... 99/545
764717  1/1957  United Kingdom .................. 99/545

*Primary Examiner*—Timothy F. Simone
*Attorney, Agent, or Firm*—Blum, Kaplan, Friedman, Silberman & Beran

[57] ABSTRACT

A pineapple cutter, wherein a smaller diameter tubular cutter for cutting the core of a pineapple and a larger diameter tubular cutter for cutting the peel of the pineapple are concentrically arranged on upper peripheral edge of a cylindrical body having a base disc, between said cutters a pineapple loading table is inserted loosely in vertically movable state, a horizontal rod for vertical movement of said loading table is connected with a vertically operating rod passing through a slant groove which is provided obliquely in vertical direction in the peripheral said wall of said cylindrical body.

According to said arrangement, the disadvantage of usual pineapple cutter is completely eliminated, assuring simultaneous removing of hard peel and core of a pineapple easily and accurately.

12 Claims, 5 Drawing Figures

PINEAPPLE CUTTER

BACKGROUND OF THE INVENTION

Up to the present, the pineapple cutter by means of manual operation has been contrived in various ways, however, any of them could not get rid of poor utility.

SUMMARY OF THE INVENTION

This invention relates to a pineapple cutter which can remove peel and core at the same time, when fresh pineapple is used for food.

The object of this invention is to provide a pineapple cutter, in which above mentioned defect is eliminated, enabling to remove at the same time hard peel and core of a pineapple easily and accurately even at the shop-front of a fruit store.

BRIEF DESCRIPTION OF THE DRAWINGS

The drawings show an embodiment of a pineapple cutter according to this invention, in which.

DESCRIPTION OF THE PREFERRED EMBODIMENTS

An embodiment of this invention will be described in detail about the accompanying drawings as follows.

Figure 1:
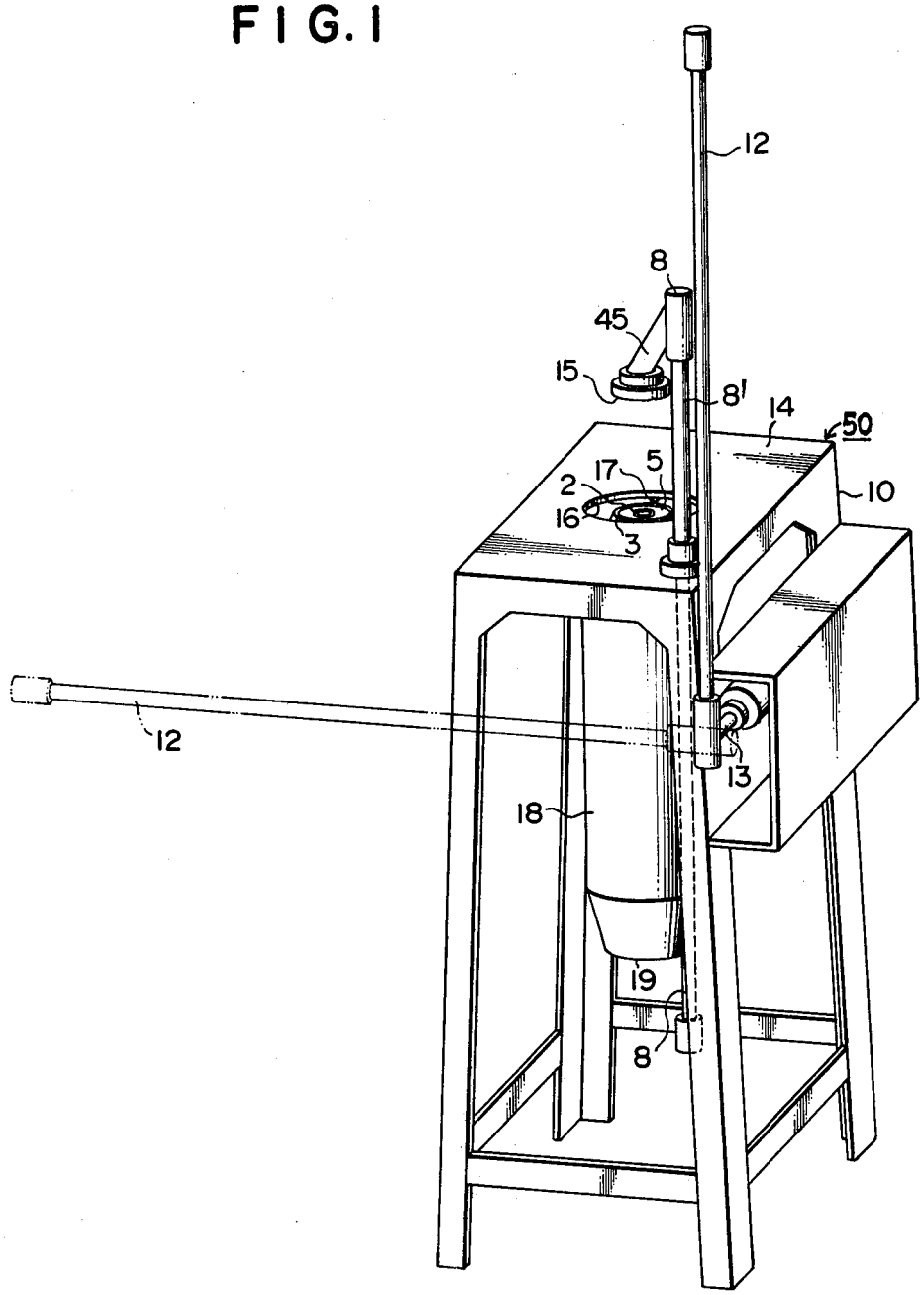
FIG. 1 is a whole external perspective view.
Figure 2:
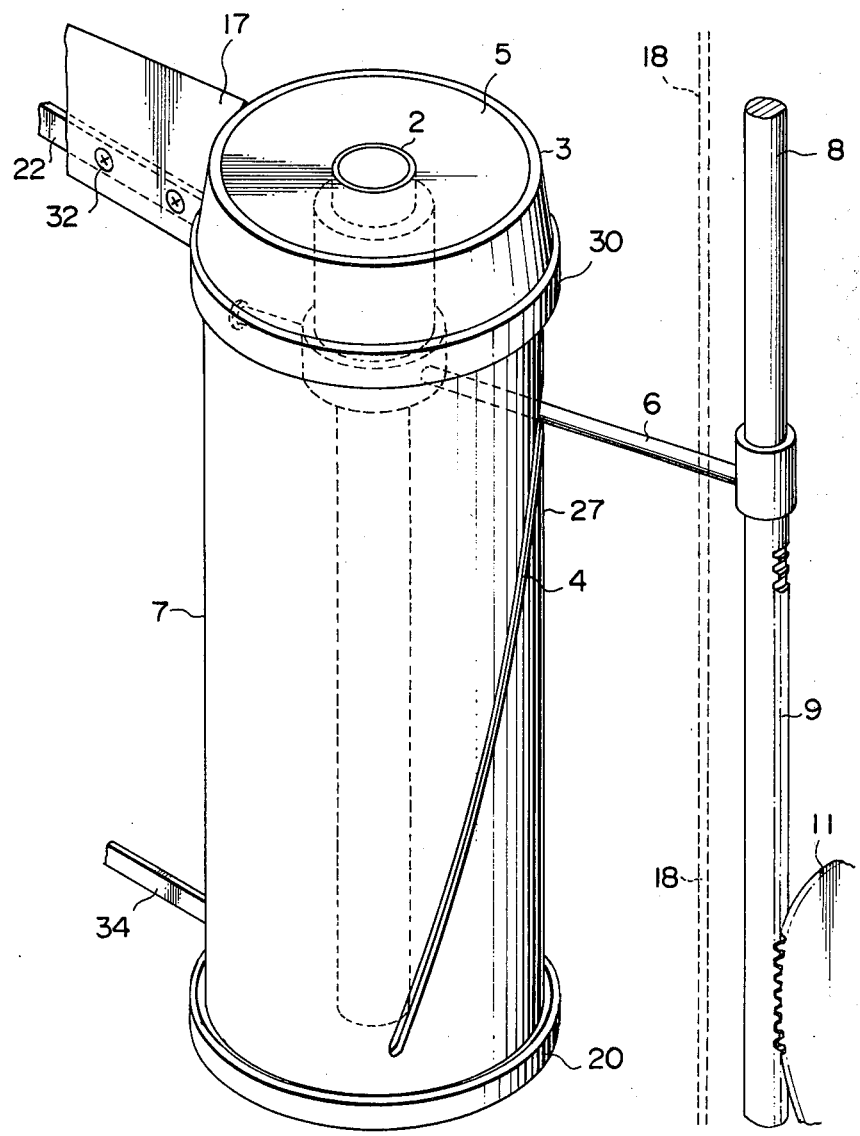
FIG. 2 is a partially cutaway perspective view of the main part of the cutter shown in FIG. 1, including a tubular cutter, a cylindrical body and the like for peeling of a pineapple.
Figure 3:
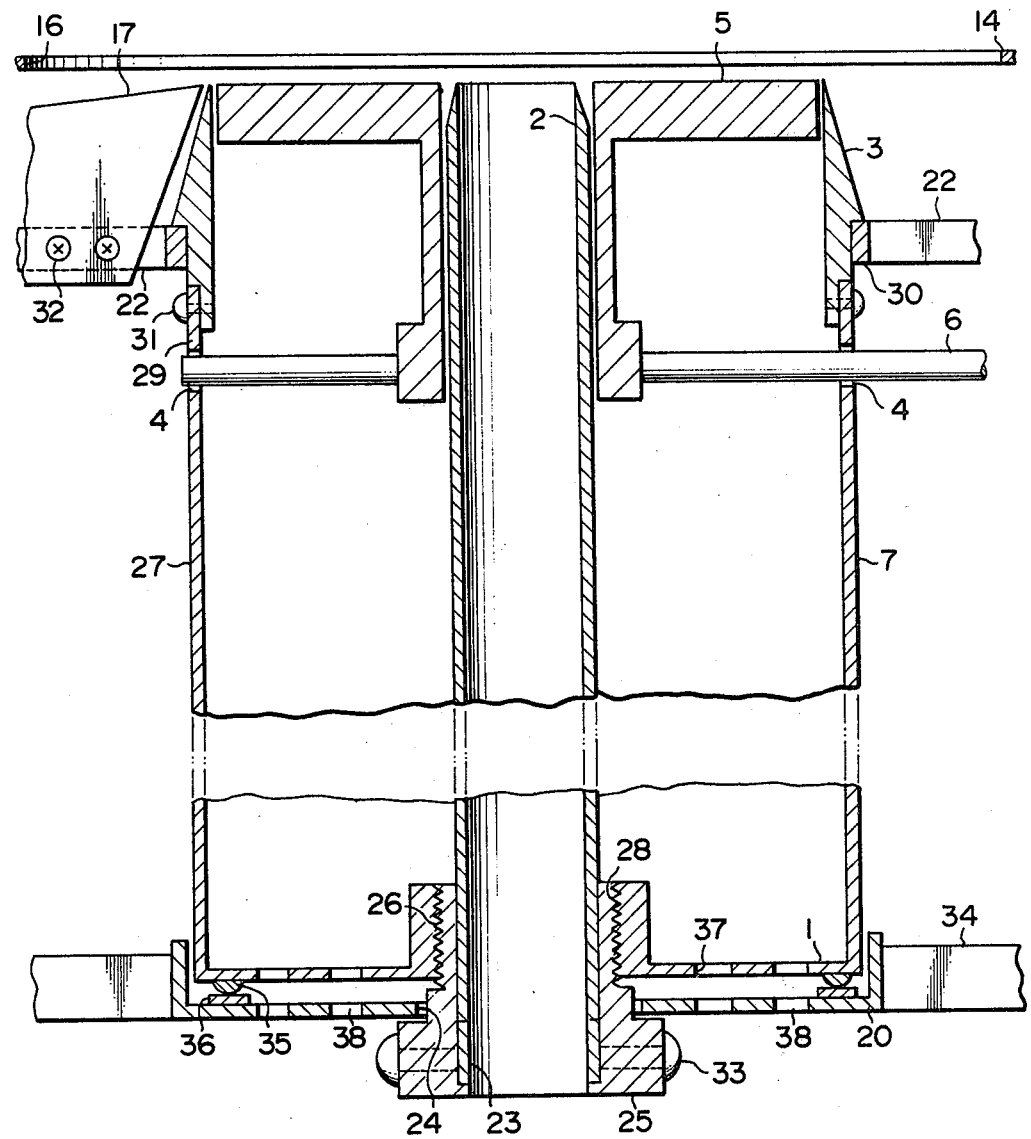
FIG. 3 is a partially cutaway sectional side view of FIG. 2.

As shown in FIG. 2 and FIG. 3, on upper peripheral edge portion of a cylindrical body (7) having a base disc (1) on which a tubular cutter (2), for cutting the core of a pineapple, having smaller diameter and larger height than standard length of pineapple is erected, a larger diameter tubular cutter (3) for peeling of a pineapple is detachably fitted by screws (31) concentrically with said tubular cutter (2) so as to become nearly same height as said tubular cutter (2), as well as, between said two tubular cutter of larger diameter (3) and of smaller diameter (2), a loading table (5) for pineapple is vertically movably and loosely inserted, and a horizontal rod (6) for vertical movement of said loading table (5) is connected to a vertically operating rod (8) passing through a slant groove (4) which is provided obliquely in vertical direction in a side peripheral wall (27) of said cylindrical body (7), and the base disc (1) of the cylindrical body (7) is rotatably mounted on a base disc supporter (20) fitted to a frame (10) of the pineapple cutter (50) so that said cylindrical body (7), the larger diameter tubular cutter (3) and the smaller diameter tubular cutter (2) are rotated accompanied with vertical movement of said vertically operating rod (8), which is provided with a rack (9) in vertical direction and mounted on the frame (10). A rotating shaft caused to turn by means of a turning lever (12) rotates a gear (11) meshing with said rack by means of a turning lever (12), and further, as shown in FIG. 1, a pressing disc (15) for pineapple is projectingly provided on an upwardly projected portion (8') passing through an upper wall (14) of the frame, with an interval corresponding to the standard length of a pineapple at a position above said loading table (5) for pineapple.

In FIG. 1, (16) is a circular window, which is bored with larger inside diameter than outside diameter of the largest size of a pineapple, at the upper wall (14) of the frame (10), and a plurality of peelig cutters (17), (17), (17) are detachably and radially fitted by means of screws (32), (32), (32) to fitting rods (22), (22), (22) from the frame (10), at a position a little lower than said circular window (16) and outside of said larger diameter tubular cutter (3). Thereby, the peel cut by means of this cutter (3) will be divided into a plurality of pieces and dropped downward. For preventing thus dropped peel from outward scattering, a cylindrical cover (18) is fitted to the frame (10). (19) is a lower opening of the cylindrical cover (18) and a peel receiving bag (not shown) or a peel receiving bucket will be placed below said opening (19). (21) is a coil spring spanned in the vertical direction, which is fitted between the lower end of the vertically operating rod (8) and the upper wall (14) of the frame (10), serving to assist the force of user when the loading table (5) for pineapple is raised, after the peel and the core of a pineapple is cut off.

As shown in FIG. 3, the lower end portion (23) of said smaller diameter tubular cutter (2) passes through the central hole (24) of said base disc supporter (20), below which said lower end portion is fixed by screws (33) to a fitting block (25) for tubular cutter having larger diameter than that of said central hole (24). On the upper portion of said fitting block (25) for tubular cutter, screw thread (26) is cut to mesh with screw thread portion (28) at central portion of said base disc (1), thereby said smaller diameter tubular cutter (2) is detachably fitted to the base disc (1) and said cylindrical body (7) will not be detached from the base disc supporter (20).

As shown in FIG. 3, an annular projection (35) is provided near the peripheral edge of base disc (1) of the cylindrical body (7) and corresponding thereto an annular receiving seat (36) made of vinyl and the like is mounted on the base disc supporter (20). (34) is a supporting rod for fitting the base disc supporter (20) to the frame (10). (37), (38) are drain holes respectively bored in the base disc (1) and the base disc supporter (20). (30) is an annular body to receive the larger diameter tubular cutter (3) and to aid smooth rotation thereof, and said annular body (30) for receiving the larger diameter tubular cutter is fixed to the frame (10) through a fitting rod (22) of said peeling cutter (17).

Figure 4:
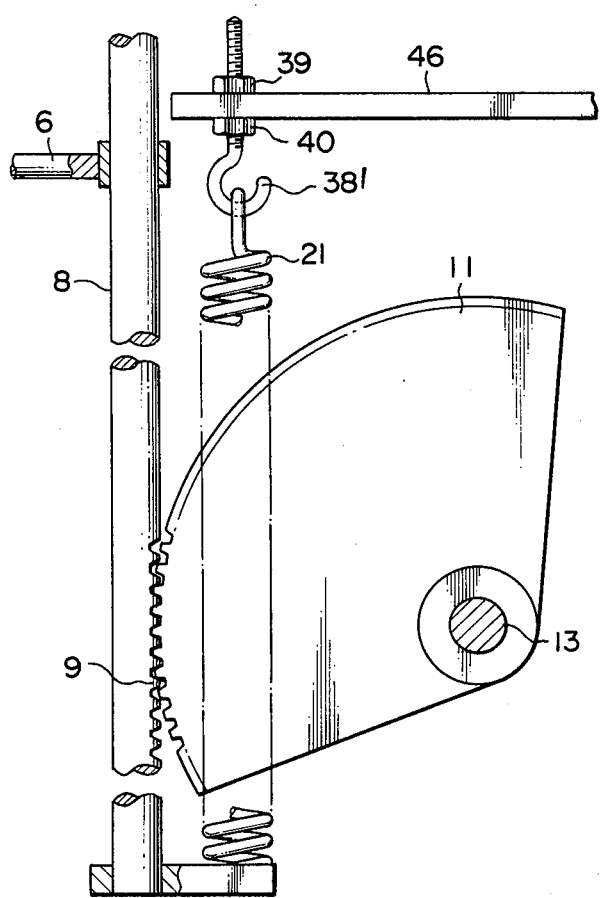
FIG. 4 is a partially cutaway side view, including a vertically operating rod and the like shown in FIG. 1.

As shown in FIG. 4, the upper portion of said coil spring (21) is fitted to platform (46) from the frame (10) through a hanging hook (38') with threaded rod, and respectively clamped by nuts (39), (40) on upper face and lower face of said fitting platform (46), thereby the tension of the coil spring (21) can be adjusted for the convenience of users.

Figure 5:
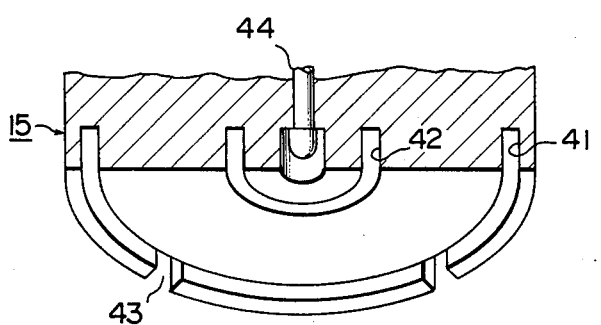
FIG. 5 is a partially cutaway perspective view of a pressing disc for pineapple shown in FIG. 1.

As shown in FIG. 5, in the under face of the pressing disc (15) for pineapple, two of larger and smaller circular grooves (41), (42), which are enough to receive said larger diameter tubular cutter (3) and said smaller diameter tubular cutter (2), are bored, as well as grooves (43), (43), (43), which are enough to receive said peeling cutters (17), (17), (17), are notched. (44) is a set-screw for fitting the pressing disc (15) to an arm rod (45) from the vertically operating rod (8).

This invention is composed as above mentioned manner, wherein a pineapple of which upper and lower end portions are cut off into required size is loaded on the loading table (5), then the turning lever (12) is turned to lower said loading table (5) and to push the pineapple downward by means of the pressing disc (15), thereby hard peel and core of the pineapple are cut off respectively by the larger diameter tubular cutter (2), thus forming the pineapple into predetermined shapes to be eaten easily.

The device according to this invention is characterized in various points that it is easy to use and even with weak human power sufficient forming of pineapple is possible, cleaning after its use is sufficiently effected merely with water pouring inside and outside of the device by means of a hose, handling of the device is simple, and the like.

What is claimed is:

1. A pineapple cutter for removing the peel and core of a pineapple, comprising:
   a cylindrical body having a base disk at one end and being open at the other end;
   a first tubular cutter for cutting the core of said pineapple, said tubular cutter being connected to said base disk and having a first diameter;
   a second tubular cutter for peeling said pineapple, said second cutter having a second diameter larger than said first cutter and being mounted on the open circular edge of said cylindrical body, said first and second cutters being concentric;
   an annular loading table, said first cutter passing through a central opening in said loading table with wide clearance, said loading table fitting with wide clearance within said second tubular cutter;
   a rod connected to said loading table, said rod being adapted to move and translate said loading table within said cylindrical body in a direction parallel to the longitudinal axis of said cylindrical body and said tubular cutters, said rod passing through a slanting groove provided in the side wall of said cylindrical body, said groove being non-parallel to the longitudinal axis of said cylindrical body, said cylindrical body, said second tubular cutter and said first tubular cutter being rotated relative to said loading table when said rod moves and translates said loading table parallel to said longitudinal axis;
   means for moving said rod;
   a pressing disk connected to said rod at a position displaced from said loading table and moving with said rod, the spacing between said loading table and said pressing disk corresponding to the length of a pineapple prepared to be peeled and cored.

2. A pineapple cutter as claimed in claim 1, and further comprising a plurality of peeling cutters symmetrically arranged around said second tubular cutter and extending radially thereto.

3. A pineapple cutter as claimed in claim 2, wherein the cutting edges of said first and second cutters are substantially equidistant from said base disk.

4. A pineapple cutter as claimed in claim 1, and further comprising a frame for said pineapple cutter, and said means for moving said rod including a rack, said rack being oriented in the direction of said longitudinal axis of said cylindrical body, and a gear mounted for rotation on a shaft, said gear meshing with said rack and being rotated by a lever, said rod being connected to said rack and moving therewith when said gear rotates.

5. A pineapple cutter as claimed in claim 4, and further comprising a base disk supporter fitted to said frame, said base disk of said cylindrical body being rotatably positioned on said base disk supporter, said cylindrical body and said first and second cutters rotating relative to said frame when said rod moves.

6. A pineapple cutter as claimed in claim 5, and further comprising a plurality of peeling cutters symmetrically arranged around said second tubular cutter and extending radially thereto.

7. A pineapple cutter as claimed in claim 6, and further comprising a suface on said frame, said surface being transverse to the longitudinal axis of said cylindrical body and said cutters and spaced apart from said cutting edges of said cutters, a circular opening in said surface being concentric with said cylindrical body and cutters, said circular opening having a diameter greater than said second tubular cutter, a portion of said radially extended peeling cutters being exposed through said surface opening.

8. A pineapple cutter as claimed in claim 7, wherein a lower end portion of said smaller diameter first tubular cutter passes through a central hole in said base disk supporter, and further comprising a fitting block having a first portion with a larger diameter than said central hole, said lower end portion of said smaller diameter first tubular cutter extending through said central hole and being detachably connected to said fitting block, a second portion of said fitting block extending through said central hole of said base disk supporter and detachably engaging said base disk of said cylindrical body, said cylindrical body being maintained at a fixed distance from said base disk supporter by said fitting block engaging said base disk.

9. A pineapple cutter as claimed in claim 6, wherein a lower end portion of said smaller diameter first tubular cutter passes through a central hole in said base disk supporter, and further comprising a fitting block having a first portion with a larger diameter than said central hole, said lower end portion of said smaller diameter first tubular cutter extending through said central hole and being detachably connected to said fitting block, a second portion of said fitting block extending through said central hole of said base disk supporter and detachably engaging said base disk of said cylindrical body, said cylindrical body being maintained at a fixed distance from said base disk supporter by said fitting block engaging said base disk.

10. A pineapple cutter as claimed in claim 1, and further comprising a frame for said pineapple cutter and a base disk supporter fitted to said frame, said base disk of said cylindrical body being rotatably positioned on said base disk supporter, said cylindrical body and said first and second cutters rotating relative to said frame when said rod moves.

11. A pineapple cutter as claimed in claim 10, wherein a lower end portion of said smaller diameter first tubular cutter passes through a central hole in said base disk supporter, and further comprising a fitting block having a first portion with a larger diameter than said central hole, said lower end portion of said smaller diameter first tubular cutter extending through said central hole and being detachably connected to said fitting block, a second portion of said fitting block extending through said central hole of said base disk supporter and detachably engaging said base disk of said cylindrical body, said cylindrical body being maintained at a fixed distance from said base disk supporter by said fitting block engaging said base disk.

12. A pineapple cutter as claimed in claim 1, wherein the cutting edges of said first and second cutters are substantially equidistant from said base disk.

* * * * *